United States Patent

Vijlee et al.

[11] Patent Number: 5,891,336
[45] Date of Patent: Apr. 6, 1999

[54] ROLLED THREADED FILTER BOWL

[75] Inventors: Abbas F. Vijlee, McKees Rocks; Mark E. Rudzik, Coraopolis, both of Pa.

[73] Assignee: Alco Industries, Inc., Valley Forge, Pa.

[21] Appl. No.: 817,134

[22] PCT Filed: Mar. 3, 1997

[86] PCT No.: PCT/US97/00027

§ 371 Date: Apr. 9, 1997

§ 102(e) Date: Apr. 9, 1997

[87] PCT Pub. No.: WO94/40911

PCT Pub. Date: Nov. 6, 1997

Related U.S. Application Data

[60] Provisional application No. 60/016,724, May 2, 1996.
[51] Int. Cl.[6] .................................................. B01D 35/00
[52] U.S. Cl. .......................... 210/440; 210/444; 210/238; 29/896.62
[58] Field of Search ............................... 29/896.6, 896.62; 210/232, 238, 440, 443, 444

[56] References Cited

U.S. PATENT DOCUMENTS

| | | | |
|---|---|---|---|
| 4,042,983 | 8/1977 | Carpenteir | 210/163 |
| 4,087,362 | 5/1978 | Hutto, Jr. | 210/433.1 |
| 4,199,454 | 4/1980 | Sartore | 210/222 |
| 4,783,271 | 11/1988 | Silverwater | 210/742 |
| 4,933,093 | 6/1990 | Keller | 210/774 |

*Primary Examiner*—David A. Reifsnyder
*Attorney, Agent, or Firm*—Webb Ziesenheim Bruening Logsdon Orkin & Hanson, P.C.

[57] ABSTRACT

A filter bowl is disclosed. The filter bowl includes an elongated canister having an open end, a closed end and a wall having an exterior surface, the exterior surface having a plurality of rolled threads. The exterior surface includes an unthreaded portion disposed between the open end and the plurality of rolled threads. The filter bowl is preferably made of steel and is produced in a process including the steps of: 1) deep drawing the elongated canister and 2) rolling threads onto the exterior surface of the canister.

27 Claims, 1 Drawing Sheet

ROLLED THREADED FILTER BOWL

CROSS REFERENCE TO RELATED APPLICATION

This application claims the benefit of earlier filed U.S. Provisional Patent Application Serial No. 60/016,724, filed on May 2, 1996.

BACKGROUND OF THE INVENTION

1. Field of the Invention

The present invention relates to a rolled threaded filter bowl for use with medium pressure filters.

2. Description of the Prior Art

Medium pressure filters such as those used in hydraulic oil systems for hydrostatic drives must withstand pressures greater than 400 PSI. Furthermore, they are subject to repeated or cyclic applications of pressure. Conventional medium pressure filters include a metal bowl or canister typically made from steel and a filter element contained within the bowl. The bowl is attached to a filter head which is in fluid communication with a conduit through which the hydraulic fluid passes. Such bowl and filter element arrangements are manufactured as a single unit. The open end of the canister is threaded to engage with the filter head. Such filter are known in the art as "spin-on" filters. The entire bowl with filter element thereon is spun onto the filter head and then is in fluid communication with the conduit.

When the filter element has become fouled from use and reaches its usable life, the entire filter including the filter element and bowl are removed from the filter head and is then disposed of. Because the filter element and bowl constitute a single unit, disposal of the filter element also dictates disposal of the filter bowl. Disposal of both portions of the conventional spin-on filter, namely the fouled filter element and the metal bowl, is wasteful in that the bowl is not fouled and is environmentally unsound.

One solution to this problem is to employ a reusable extruded metal (e.g., aluminum) bowl having threads for engagement with the filter head. Such threads are conventionally machined into the exterior surface of the metal. Because of the machining process, the wall of the bowl in the area of the machined thread must be relatively thick, for example, about ½ inch. Attempts to machine threads on thinner walled bowls typically fail because the machining process cuts completely through the thickness of the bowl wall rendering the bowl useless.

It is desirable to minimize the number of threads on the bowl. Fewer threads requires less threading and rotating of the bowl during installation and removal. However, when the thread number is low, the thread height (valley to peak) must be increased. Greater thread height requires that the walls of the bowl be relatively thick to allow sufficient material to be cut to create the threads. Medium pressure filters do not require such relatively thick-walled filter bowls to withstand the internal pressure of filtration. Thus, thick-walled filter bowls use an unnecessary amount of metal with respect to their pressure ratings only so that threads may be machined therein.

Furthermore, machined threads can detrimentally alter the metallurgical properties of the metal of the bowl. Such threads can also induce stress within the bowl. Threads produced by machining typically have rough surfaces and thus are easily filled by dirt, dust and the like.

Accordingly, a need remains for a thin walled threaded filter bowl which is reusable and easy to install yet can withstand medium pressures.

SUMMARY OF THE INVENTION

This need is met by the present invention which is a filter bowl including an elongated canister having an open end, a closed end and wall having an external surface, the external surface having a plurality of rolled threads. An unthreaded portion is disposed between the open end and the plurality of rolled threads. Preferably, the canister is made of steel.

The thickness of the wall of the canister is preferably about 0.045 to 0.068 inch and withstands internal pressures of about 800 PSI and has a minimum yield pressure of at least 2400 PSI. Preferably, there are 4 to 6 threads per inch on the exterior surface of the open end.

A torquing nut, preferably a hexagonal nut, is disposed on the closed end for tightening the filter bowl into a filtration apparatus.

Preferably, the exterior surface of the canister is coated with a powder coating extending from the terminal thread of the plurality of threads over the closed end and the torquing nut.

The present invention also includes a filter assembly having an elongated canister having an open end, a closed end and wall having an exterior surface, the exterior surface having a plurality of rolled threads and an unthreaded portion disposed between the open end and the plurality of rolled threads. A filter element is disposed inside the canister and a porting head is threaded to engage with the plurality of threads of the canister and is in fluid communication with fluid stream. A sealing ring, preferably an O-ring, surrounds the unthreaded portion for sealing the elongated canister within the filter assembly. A torquing nut, preferably a hexagonal nut, is fixed to the closed end to provide a surface for applying torque to the canister to install it within the filter assembly. The canister is preferably made of steel and there are preferably about 4 to 6 threads per inch.

The present invention also includes a method of manufacturing a threaded filter bowl including the steps of: a) deep drawing an elongated canister having an open end, a closed end and a wall having an exterior surface and b) rolling a plurality of threads onto the exterior surface. The elongated canister is preferably made of steel. An unthreaded portion is disposed between the open end and the plurality of threads on the exterior surface of the canister. The inventive method further includes attaching a torquing nut to the closed end of the canister and coating the exterior surface of the canister from a terminal thread of the plurality of threads up to and including the closed end and torquing nut.

DESCRIPTION OF THE PREFERRED EMBODIMENTS

Figure 1:
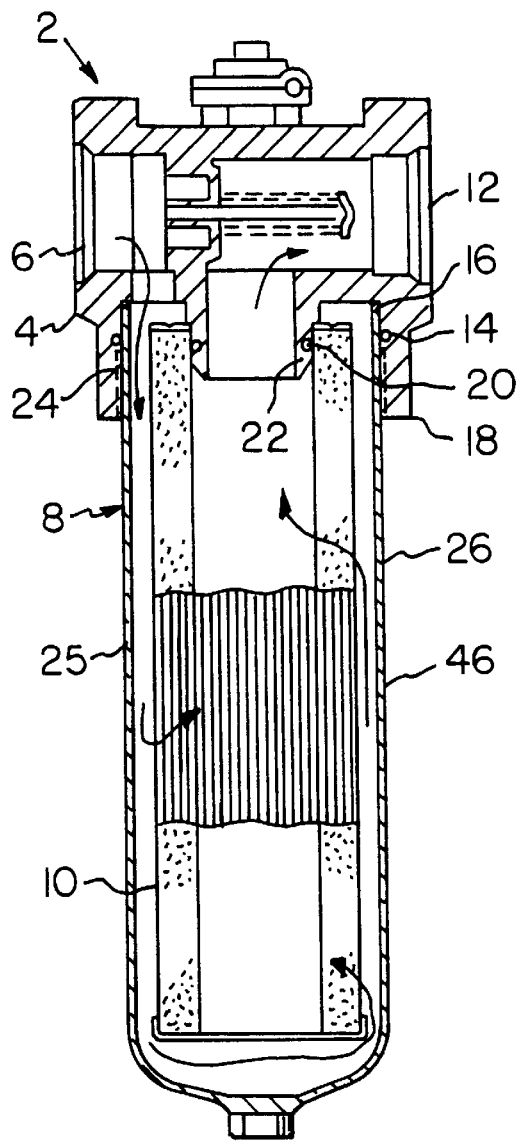
FIG. 1 is an elevation sectional view of the filter assembly of the present invention with the filter element in partial sectional elevation.

The present invention is a filter assembly as depicted in FIG. 1. The filter assembly 2 includes a porting head 4 with a porting head inlet 6 and porting head outlet 12. Fluid enters the porting head inlet 6 and flows into filter bowl or canister 8, passes through filter element 10 and flows out of porting head outlet 12. A canister O-ring 14 is disposed between the open end 16 of the filter canister and a flange 18 of the porting head 4. Filter element O-ring 20 is disposed about an interior flange 22 of the porting head 4 and the filter element 10.

Filter canister 8 includes a plurality of threads 24 on the exterior surface 26 of the filter canister 8. Flange 18 of the porting head 4 is internally threaded to accept the threads 24 of the filter canister 8.

Figure 2:
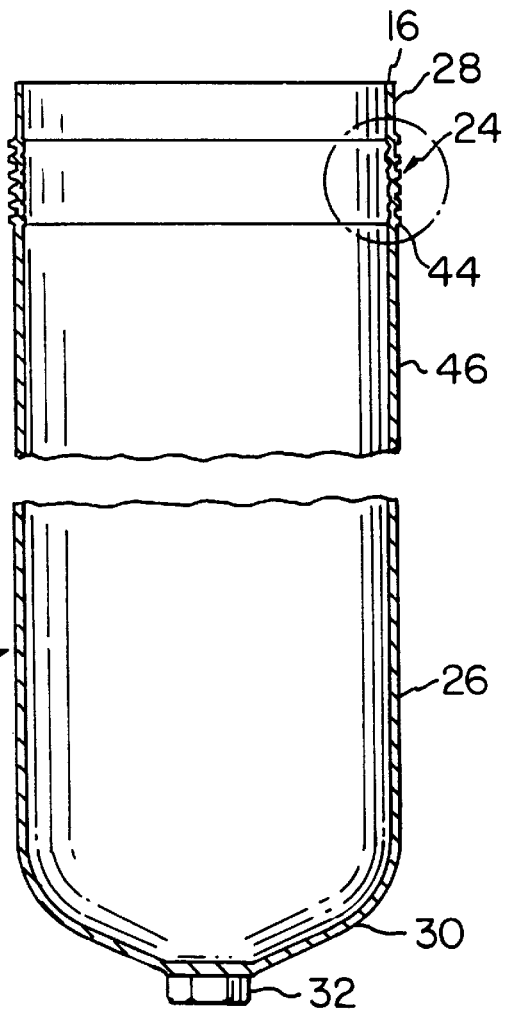
FIG. 2 is a broken, sectional elevation view of the filter canister of the present invention.

Filter canister 8 is shown in more detail in FIG. 2. The exterior surface 26 of the filter canister 8 immediately adjacent the open end 16 includes an unthreaded portion 28. This unthreaded portion 28 provides a surface for placement of canister O-ring 14 for sealing within the porting head 4.

The filter canister 8 is preferably cylindrical in shape and has a closed end 30 which is preferably semi-spherical in shape. A torquing nut 32 is disposed on the closed end 30. The torquing nut 32 is preferably a hexagonal nut. The torquing nut 32 provides a surface for gripping the filter canister 8 to thread it into porting head 4.

The plurality of threads 24 preferably includes between 4 to 6 threads per inch, preferably 4 threads per inch on the exterior surface 26 of the filter canister 8. The thickness of wall 34 of filter canister 8 is preferably between about 0.045 to 0.066 inch, more preferably between about 0.063 and 0.068 inch. The filter canister 8 is made of metal, preferably steel, and preferably has a maximum operating pressure of about 800 PSI and a minimum yield pressure of at least 2400 PSI.

The canister 8 includes a coating, preferably a powder coating 46 covering the exterior surface 26 from a terminal thread 44 to closed end 30 and torquing nut 32. The powder coating provides a protective coating over the steel of the canister 8 for use of the filter canister 8 in corrosive environments. Suitable coatings include powder coating or two part epoxy paint.

Figure 3:
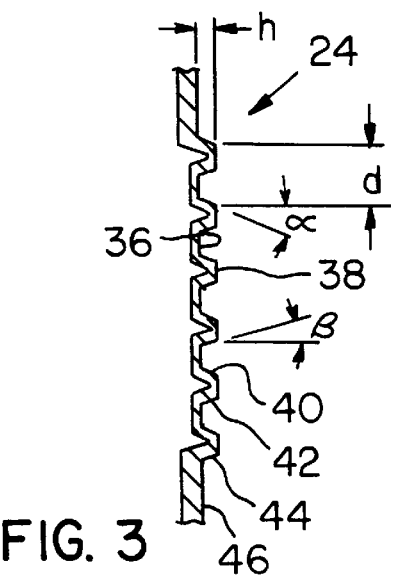
FIG. 3 is an enlarged view of the dot-dash circled portion of the filter canister of FIG. 2.

As shown in detail in FIG. 3, the height of each thread is the distance between the valley of the thread 36 and the peak of the thread 38. Preferably, the height "h" of the thread is preferably about 0.045 to 0.062 inch. Both the thread valleys 36 and thread peaks 38 include flat surfaces which are parallel to the wall 25 of the canister 8. The distance "d" between the leading edges of the flat portion of adjacent thread peaks is preferably about 0.15 to 0.17 inch. Each thread includes a front portion 40 which makes an angle "α" with the flat portions of thread valley 36 and thread peak 38. Each thread also includes a rear portion 42 which makes an angle "β" with the thread valley 36 and thread peak 38 in an opposite direction to the angle of front portion 40. The angle α which front portion 40 makes with a plane perpendicular to the flat portion of thread valley 36 and to the wall 25 is about 20 degrees. The angle β which rear portion 42 meet with a plane perpendicular to the flat portion of thread valley 36 and to the wall 25 is about 10 degrees.

The present invention also includes a method of manufacturing a threaded filter bowl. The inventive manufacturing method includes deep drawing an elongated canister having an open end, a closed end and a wall having an exterior surface and rolling a plurality of threads onto the exterior surface. An unthreaded portion of the exterior surface is disposed between the open end and the plurality of threads. The threads formed in the inventive method preferably are comparable to the threads described with respect to the inventive filter canister. The inventive method further includes attaching a torquing nut to the closed end of the canister. The inventive method also includes covering the exterior surface from a terminal thread, to closed end and torquing nut with a coating, preferably a powder coating.

Although the present invention has been described in detail in connection to the discussed embodiments, various modifications may be made by one of ordinary skill in the art without departing from the spirit and scope of the present invention. Therefore, the scope of the present invention should be determined by the attached claims.

What is claimed is:

1. A filter bowl comprising:
   an elongated canister having an open end, a closed end and a wall having an exterior surface, said exterior surface having a plurality of rolled threads.

2. The filter bowl of claim 1 wherein said exterior surface further comprises an unthreaded portion disposed between said open end and said plurality of rolled threads.

3. The filter bowl of claim 2 wherein said canister is made of steel.

4. The filter bowl of claim 3 wherein said plurality of rolled threads comprises about 4 to 6 threads per inch.

5. The filter bowl of claim 4 wherein the distance between each said thread is about 0.15 to 0.17 inch and the height of each said thread is about 0.045 to 0.062 inch.

6. The filter bowl of claim 5 wherein the thickness of the wall of said canister is about 0.045 to 0.068 inch.

7. The filter bowl of claim 6 wherein said canister withstands an internal pressure of about 800 PSI and has a minimum yield pressure of at least 2400 PSI.

8. The filter bowl of claim 1 further comprising a torquing nut disposed on said closed end.

9. The filter bowl of claim 8 wherein said torquing nut is a hex nut.

10. The filter bowl of claim 1 further comprising a powder coating disposed on said exterior surface extending from a terminal thread of said plurality of threads over said closed end and said torquing nut.

11. A method of manufacturing a threaded filter bowl comprising the steps of:
    a) deep drawing an elongated canister having an open end, a closed end and a wall having an exterior surface; and
    b) rolling a plurality of threads onto said exterior surface.

12. The method of claim 11 wherein said canister is made of steel.

13. The method of claim 12 wherein said exterior surface comprises an unthreaded portion disposed between said open end and said plurality of threads.

14. The method of claim 13 further comprising attaching a torquing nut to said closed end.

15. The method of claim 14 further comprising powder coating said exterior surface from a terminal thread of said plurality of threads over said closed end and said torquing nut.

16. A filter assembly comprising:
    an elongated canister having an open end, a closed end and a wall having an exterior surface, said exterior surface having a plurality of rolled threads and an unthreaded portion disposed between said open end and said plurality of rolled threads;
    a filter element disposed inside said canister; and
    a porting head in fluid communication with a fluid stream and said filter, said porting head threaded to engage said plurality of threads on said canister.

17. The filter assembly of claim 16 further comprising a sealing ring surrounding said unthreaded portion.

18. The filter assembly of claim 16 wherein said canister further comprises a torquing nut fixed to said closed end.

19. The filter assembly of claim 16 wherein said canister is made of steel.

20. The filter assembly of claim 19 wherein said plurality of rolled threads comprises between about 4 to 6 threads per inch.

21. The filter assembly of claim 20 wherein the distance between each said thread of said canister is about 0.15 to 0.17 inch and the height of each said thread is about 0.045 to 0.062 inch.

22. A filter bowl comprising:
   an elongated canister formed by deep drawing and having an open end, a closed end and a wall having an exterior surface, said exterior surface having a plurality of threads rolled onto said exterior surface.

23. The filter bowl of claim 22 wherein said canister is made of steel.

24. The filter bowl of claim 23 wherein said plurality of rolled threads comprises about 4 to 6 threads per inch.

25. A filter assembly comprising:
   an elongated canister formed by deep drawing and having an open end, a closed end and a wall having an exterior surface, said exterior surface having a plurality of threads rolled onto said exterior surface and an unthreaded portion disposed between said open end and said plurality of rolled threads;
   a filter element disposed inside said canister; and
   a porting head in fluid communication with a fluid stream and said filter, said porting head threaded to engage said plurality of threads on said canister.

26. The filter assembly of claim 25 wherein said canister is made of steel.

27. The filter assembly of claim 26 wherein said plurality of rolled threads comprises between about 4 to 6 threads per inch.

* * * * *